(12) United States Patent
Lee et al.

(10) Patent No.: US 8,861,931 B2
(45) Date of Patent: Oct. 14, 2014

(54) METHOD AND APPARATUS FOR REPRODUCING VIDEO USING WATERMARK INSERTING FUNCTION

(75) Inventors: Choong-hoon Lee, Seoul (KR); Jin-mok Kim, Yongin-si (KR); Ji-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 822 days.

(21) Appl. No.: 12/702,369

(22) Filed: Feb. 9, 2010

(65) Prior Publication Data

US 2010/0215342 A1 Aug. 26, 2010

(30) Foreign Application Priority Data

Feb. 20, 2009 (KR) .................. 10-2009-0014425

(51) Int. Cl.
| | |
|---|---|
| *H04N 9/80* | (2006.01) |
| *H04N 9/87* | (2006.01) |
| *H04N 21/426* | (2011.01) |
| *H04N 5/913* | (2006.01) |
| *H04N 21/432* | (2011.01) |
| *H04N 21/8358* | (2011.01) |

(52) U.S. Cl.
CPC ....... *H04N 9/8715* (2013.01); *H04N 21/42684* (2013.01); *H04N 5/913* (2013.01); *H04N 21/4325* (2013.01); *H04N 21/8358* (2013.01); *H04N 2005/91335* (2013.01)
USPC ......................................... 386/248; 386/260

(58) Field of Classification Search
USPC ................................. 386/248, 260
See application file for complete search history.

(56) References Cited

U.S. PATENT DOCUMENTS

2004/0184612 A1* 9/2004 Kohiyama et al. ............ 380/217
2009/0028526 A1* 1/2009 Kuroda ........................... 386/95

\* cited by examiner

*Primary Examiner* — Nigar Chowdhury
(74) *Attorney, Agent, or Firm* — Sughrue Mion, PLLC

(57) ABSTRACT

A method and apparatus for reproducing a video using a watermark inserting function. The method of inserting a watermark into a video being reproduced, using an on-screen-display (OSD) data mixer included in a video reproduction apparatus, includes determining a watermark pattern indicating information on reproduction of the original video. The watermark pattern is converted into watermark data capable of being recognized by an OSD data mixer and synthesized with the video being reproduced, using the OSD data mixer.

22 Claims, 6 Drawing Sheets

METHOD AND APPARATUS FOR REPRODUCING VIDEO USING WATERMARK INSERTING FUNCTION

CROSS-REFERENCE TO RELATED PATENT APPLICATION

This application claims priority from Korean Patent Application No. 10-2009-0014425, filed on Feb. 20, 2009 in the Korean Intellectual Property Office, the disclosure of which is incorporated herein in its entirety by reference.

BACKGROUND OF THE INVENTION

1. Field of the Invention

The present invention relates to video watermarking.

2. Description of the Related Art

A digital watermarking technique may be used to display copyrights and trace illegal copying, and may be adopted with digital rights management (DRM) in order to protect contents. Specifically, a watermarking technique may be used to trace illegal copying by inserting position information and time information as watermarks when reproducing contents.

In general, a watermark may be inserted by adding or multiplying a watermark signal and raw data. For example, in the case of an additive watermarking technique, a watermark may be inserted by Equation 1 as follows:

$$Y = X + W \quad (1),$$

wherein X denotes raw video data, W denotes a watermark signal, and Y denotes data into which a watermark is inserted.

A process of inserting a watermark may be embodied by hardware or software. When a watermarking technique is embodied by hardware, a watermark is inserted in real-time, however the construction and cost of the hardware is a factor, and correcting a watermarking algorithm is difficult. When a watermarking technique is embodied by software, the insertion of watermarks requires a large amount of calculations so that inserting the watermarks in real-time is difficult.

SUMMARY OF THE INVENTION

The present invention provides a method and apparatus for reproducing a video using a watermarking technique of inserting watermarks, without additional hardware.

According to an aspect of the present invention, there is provided a method of inserting a watermark into a video being reproduced. The method includes generating watermark data indicating information on reproduction of an original video; and synthesizing, by at least one of an on-screen-display (OSD) data mixer and a graphics data mixer of a video reproduction apparatus, the generated watermark data and the video being reproduced.

In an exemplary embodiment, the generation of watermark data may include generating a basic watermark pattern based on the information on reproduction of an original video; and converting, by the at least one of the OSD data mixer and the graphics data mixer, the basic watermark pattern into the watermark data capable of being synthesized with the original video being reproduced.

In an exemplary embodiment, the watermark data may include at least one of data-type color information and transparency information capable of being synthesized with the original video being reproduced. The at least one of the color information and the transparency information may be invisible when the watermark data is synthesized with the original video being reproduced.

In an exemplary embodiment, the generation of watermark data may include determining an insertion intensity of the watermark for each area based on characteristics of each area of the original video being reproduced; and controlling at least one of color information and transparency information of the watermark for each area based on the insertion intensity of the watermark for a corresponding area.

In an exemplary embodiment, the characteristics of each area may include at least one of complexity, brightness information, and color information of each area.

In an exemplary embodiment, the generation of watermark data may further include determining pixel brightness mapped to at least one sample of the basic watermark pattern.

In an exemplary embodiment, the total range of the pixel brightness of the pixel mapped to at least one sample of the basic watermark pattern may be divided into plural sections so that at least one sample of the watermark pattern can be mapped to a predetermined pixel brightness of a predetermined section.

In an exemplary embodiment, the generation of the watermark data may further include analyzing characteristics of each area of the original video; and determining pixel brightness mapped to at least one sample based on the characteristics of each area among pixel brightness values of the predetermined section. In this case, the characteristics of each area may include at least one of complexity, brightness information, and color information of each area.

In an exemplary embodiment, the information on reproduction of an original video may indicate information on at least one of the video reproduction apparatus, a reproduction position, a production time, a reproduction time, and a user of the video reproduction apparatus.

According to another aspect of the present invention, there is provided a video reproduction apparatus having a watermark inserting function. The apparatus includes an original video storage unit that stores an original video; a watermark data generation unit that generates watermark data indicating information on reproduction of the original video; and a watermark synthesis that synthesizes the generated watermark data with the original video being reproduced, by a mixing process using graphics data including OSD data.

According to another aspect of the present invention, there is provided a watermark detection apparatus including a receiving unit that receives a video including a watermark; a watermark detection unit that detects the watermark to obtain watermark data from the received video; and an original video information extraction unit that extracts information on reproduction of an original video of the received video using the detected watermark data. The watermark data is video-data-type data into which a watermark pattern indicating information on reproduction of the original video is converted. Also, the received video is generated by synthesizing watermark data, of which the transparency is controlled according to an insertion intensity of the watermark data, and the original video using an OSD data mixer or the graphics data mixer.

According to another aspect of the present invention, there is provided a computer-readable medium having embodied thereon a computer program for causing a computer to execute a method of reproducing a watermark-inserted video according to an embodiment.

According to another aspect of the present invention, there is provided a computer-readable medium having embodied thereon a computer program for causing a computer to execute a method of detecting a watermark according to an embodiment.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 1:
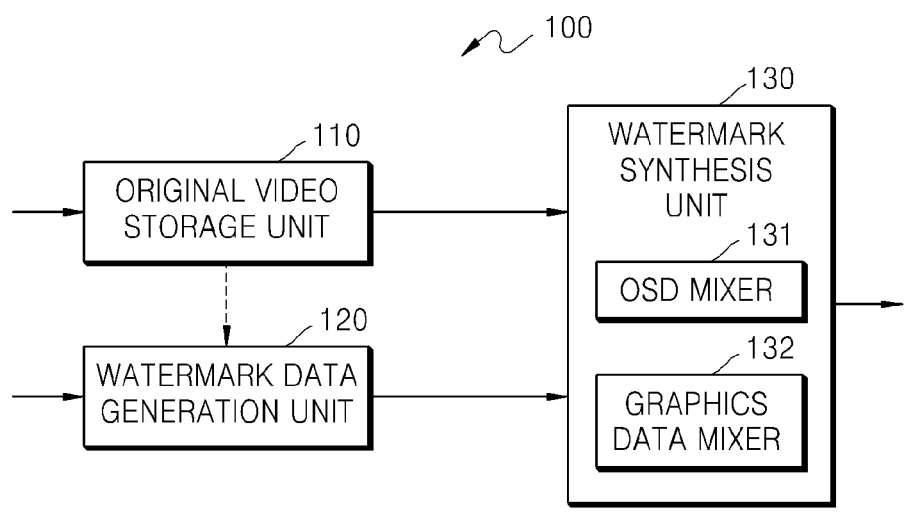
FIG. 1 is a block diagram of a video reproduction apparatus having a watermark inserting function, according to an exemplary embodiment of the present invention.

FIG. 1 is a block diagram of a video reproduction apparatus 100 having a watermark inserting function, according to an exemplary embodiment of the present invention.

The video reproduction apparatus 100 may include an original video storage unit 110, a watermark data generation unit 120, and a watermark synthesis unit 130. The watermark synthesis unit 130 may include an on-screen-display (OSD) data mixer 131 or a graphics data mixer 132.

The original video storage unit 110 may receive an original video into which a watermark will be inserted, and store the original video. The original video storage unit 110 may output the original video to the watermark synthesis unit 130.

The watermark data generation unit 120 may determine a watermark pattern indicating information on a video or reproduction of the video, convert the watermark pattern into a format capable of being synthesized with the video by the watermark synthesis unit 130, and generate watermark data. Also, the watermark data generation unit 120 may determine the insertion intensity of the watermark and determine the watermark data according to the insertion intensity of the watermark. The watermark data determined by the watermark data generation unit 120 may be output to the watermark synthesis unit 130.

The watermark data generation unit 120 may convert the watermark pattern into a data format having color information and transparency information so that the watermark pattern is converted into a data format capable of being synthesized by the OSD data mixer 131 or the graphics data mixer 132 of the watermark synthesis unit 130.

For example, each data sample may include a value α indicating transparency information and color information according to the red-green-blue (RGB) color model and converted into an αRGB data format. Alternatively, each data sample may be converted into a format including a value α indicating transparency information and Y-, U-, and V-channel color information according to the YUV color model.

The watermark pattern may be determined based on information on the original video or the reproduction of the original video. For example, the watermark pattern may indicate information on an apparatus for generating watermark insertion information, that is, identification (ID) information, a position of the apparatus, and information on a reproduction time.

Also, the watermark pattern may be determined to include information on a user that is currently reproducing the video. For security, a spread spectrum watermarking technique may be employed. In this case, the watermark pattern may be generated as a random number sequence to express the above-described information. For instance, each value forming the watermark pattern may have a random value of 0 and 1, or may be expressed as a random real number or random integral number with a specific distribution. In addition, the watermark pattern may have one of various forms according to a watermarking algorithm.

The watermark data generation unit 120 may analyze a video characteristic including at least one of a complexity, a brightness, and a color according to each video area of the original video.

The watermark data generation unit 120 may control watermark data corresponding to each video area based on the analysis result of the video characteristic of each video area. For example, color information or transparency information of each sample of the watermark data may be controlled according to the video information of a corresponding video area. By controlling the watermark data according to the video characteristic of each video area, the invisibility of the watermark may be increased.

When each sample of the watermark has a random bit stream including bits having a value of '0' or '1', a transparency value and a color value of each bit may be mapped so that each sample is converted into watermark data having a format capable of being synthesized with a reproduction video by the OSD data mixer 131 or the graphics data mixer 132 of the watermark synthesis unit 130.

For example, when watermark data is expressed as an αRGB format, a value α may be a constant value, an RGB value of each '0' bit may be mapped to 0, and an RGB value of each '1' bit may be mapped to 255. In this case, when the watermark is inserted into a specific color channel, other color channel values may be fixed, and the corresponding color channel value may be changed depending on whether a bit value is '0' or '1'.

In another case, the total range of pixel brightness may be divided into several sections so that a bit value may be mapped to a predetermined pixel brightness of a predetermined section. For example, the total pixel brightness range [0, 255] may be divided into a first section [0, 127] and a second section [128, 255]. Thus, a '0' bit may be mapped to a value of the first section [0, 127], and a '1' bit may be mapped to a value of the second section [128, 255].

In another exemplary embodiment, when each sample value of the watermark is a real number or an integral number instead of a bit stream, each sample value may be mapped to one of brightness values belonging to a section [0, 255]. For example, assuming that respective samples of the watermark pattern have random values of which the average is 0, a sample value 0 may be mapped to 128, which is an intermediate pixel brightness value. Also, a larger sample value may be mapped to a pixel brightness value closer to 255, while a smaller sample value may be mapped to a pixel brightness value closer to 0.

Also, the watermark data generation unit 120 may control the pixel brightness of a pixel, which is mapped to at least one bit of the watermark pattern, within a predetermined pixel brightness section based on the analysis result of the video characteristic of each video area, thereby controlling watermark data of a corresponding video area.

The watermark data may be controlled in order to increase the invisibility of the watermark when the watermark is synthesized by changing the insertion intensity of the watermark data. The watermark data may be strongly inserted into a video area where the watermark is invisible, while the watermark data may be weakly inserted into a video area where the watermark is visible. As a result, the invisibility of the watermark may be increased.

For example, during the conversion of a basic watermark pattern including '0' and '1' bits into watermark data capable of being synthesized by the OSD data mixer 131 or the graphics data mixer 132 of the watermark synthesis unit 130, in a complex area where the watermark is invisible, a value α of watermark data may be increased to reduce transparency so that the relative intensity of a watermark signal may be increased during the synthesis of a video using the OSD data mixer 131 or the graphics data mixer 132 of the watermark synthesis unit 130. Alternatively, a difference between RGB values corresponding to '0' and '1' bits may be increased in the complex area, while the difference between the RGB values corresponding to the '0' and '1' bits may be reduced in a simple area, so that a variation in the video due to the watermark can be reduced, thereby controlling the invisibility of the watermark.

Similarly, when each sample value of a basic watermark pattern is a real number or an integral number instead of a bit stream, the range of RGB values corresponding to respective sample values of the watermark pattern may be adjusted, thereby controlling the invisibility of the watermark. For example, the range of the RGB values corresponding to the respective sample values of the watermark pattern may be widened to increase a variation in the RGB value according to a watermark sample value in the complex area, while the range of the RGB values corresponding to the respective sample values of the watermark pattern may be narrowed to decrease a variation in the RGB value according to a watermark sample value in the simple area. As a result, the invisibility of the watermark may be controlled.

The watermark synthesis unit 130 may receive original video data from the original video storage unit 110 and receive watermark data from the watermark data generation unit 120. The watermark synthesis unit 130 may synthesize the watermark data with the original video using the transparency of the watermark data and generate a watermark-inserted video.

The video reproduction apparatus 100 having a watermark inserting function may synthesize the watermark data with the original video, which is received from the original video storage unit 110, based on the transparent value α of the watermark data by use of a mixing function of the OSD data mixer 131 or the graphics data mixer 132 of the watermark synthesis unit 130.

The original video storage unit 110 of the video reproduction apparatus 100 having a watermark inserting function may be included in a memory of the video reproduction apparatus 100, and watermark data generated by the watermark data generation unit 120 may also be stored in the memory of the video reproduction apparatus 100.

Therefore, the video reproduction apparatus 100 having a watermark inserting function may synthesize a watermark with an original video using software by use of a conventional OSD data mixer or graphics data mixer installed in the video reproduction apparatus 100 so that a watermarking operation can be performed in real-time, without additional hardware required for watermark insertion.

Furthermore, the transparency or color information of a watermark may be controlled based on an analysis result of an original video, thereby adaptively adjusting the invisibility of the watermark to the characteristic of the original video.

Figure 2:
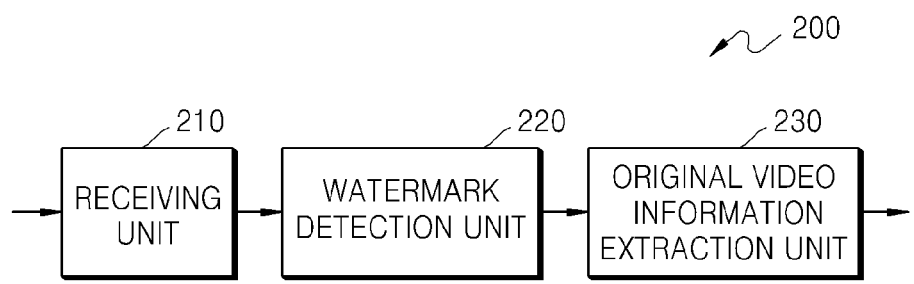
FIG. 2 is a block diagram of a watermark detection apparatus according to an exemplary embodiment of the present invention.

FIG. 2 is a block diagram of a watermark detection apparatus 200 according to an exemplary embodiment of the present invention.

The watermark detection apparatus 200 according to the present exemplary embodiment may include a receiving unit 210, a watermark detection unit 220, and an original video information extraction unit 230.

The receiving unit 210 may receive a video including a watermark and output the received video to the watermark detection unit 220. The received video may be a video obtained by synthesizing watermark data with an original video at a received-video transmitting terminal using the OSD data mixer 131 or the graphics data mixer 132 of the watermark synthesis unit 130.

Among the received video, the watermark data, of which the transparency is controlled, may be synthesized with the original video. The transparency of the watermark data may be controlled in consideration of at least one of noise, a brightness, and a dispersion value of the original video. The foregoing received-video transmitting terminal may include the video reproduction apparatus 100 having the watermark inserting function according to an exemplary embodiment of the present invention.

The watermark detection unit 220 may detect the watermark data from the video received from the receiving unit 210 and output the watermark data to the original video information extraction unit 230. The watermark detection unit 220 may detect the watermark data in a process opposite to the watermarking process used for inserting the watermark at the received-video transmitting terminal previously discussed.

The original video information extraction unit 230 may extract information on the reproduction of the original video of the received video using the watermark data detected by the watermark detection unit 220. The original video information extraction unit 230 may extract, from the watermark data, ID information on the video reproduction apparatus 100 having the watermark inserting function of the received-video transmitting terminal, information on a reproduction position and reproduction time, or user ID information of the video reproduction apparatus 100 having the watermark inserting function. An information extraction mode may correspond to a mode of generating watermark data at the received-video transmitting terminal.

Accordingly, the watermark detection apparatus 200 may receive the watermark-inserted video and detect a source of the watermark-inserted video from the received video. Thus, the watermark detection apparatus 200 may trace illegal copying and protect the rights of copyright holders.

By smoothly detecting the watermark using the watermark detection apparatus 200, the video reproduction apparatus 100 having a watermark inserting function can effectively generate and transmit a watermark-inserted video in real-time using software, without additional hardware required for watermark insertion by use of an OSD data mixer 131 or graphics data mixer 132 installed in the video reproduction apparatus 100 provided at the transmitting terminal.

Figure 3:
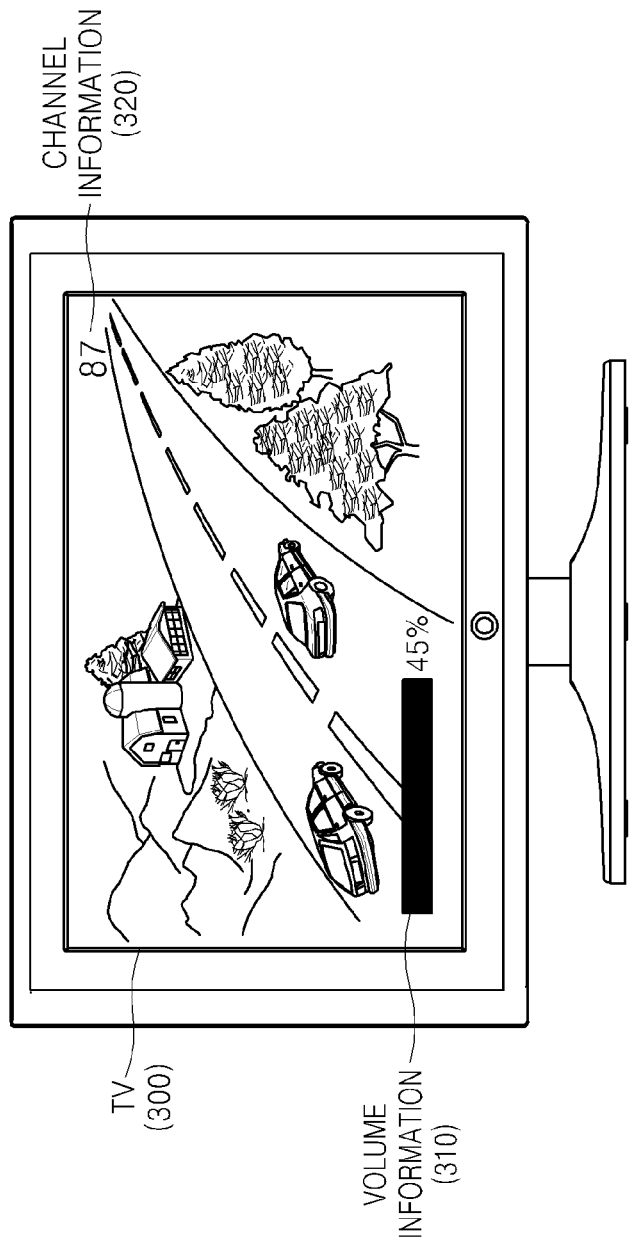
FIG. 3 illustrates a screen on which an on-screen-display (OSD)-type display is embodied.

FIG. 3 illustrates a screen on which an OSD-type display is embodied.

The OSD-type display may display graphics information, such as volume information 310, channel information 320, and electronic program guide (EPG) information (not shown), on a television (TV) 300 video being reproduced, in a contents reproduction apparatus including a display device, such as a digital TV. The graphics information may not be displayed by transforming reproduced video data, but may be displayed on a video being reproduced, using a hardware mixer.

Figure 4:
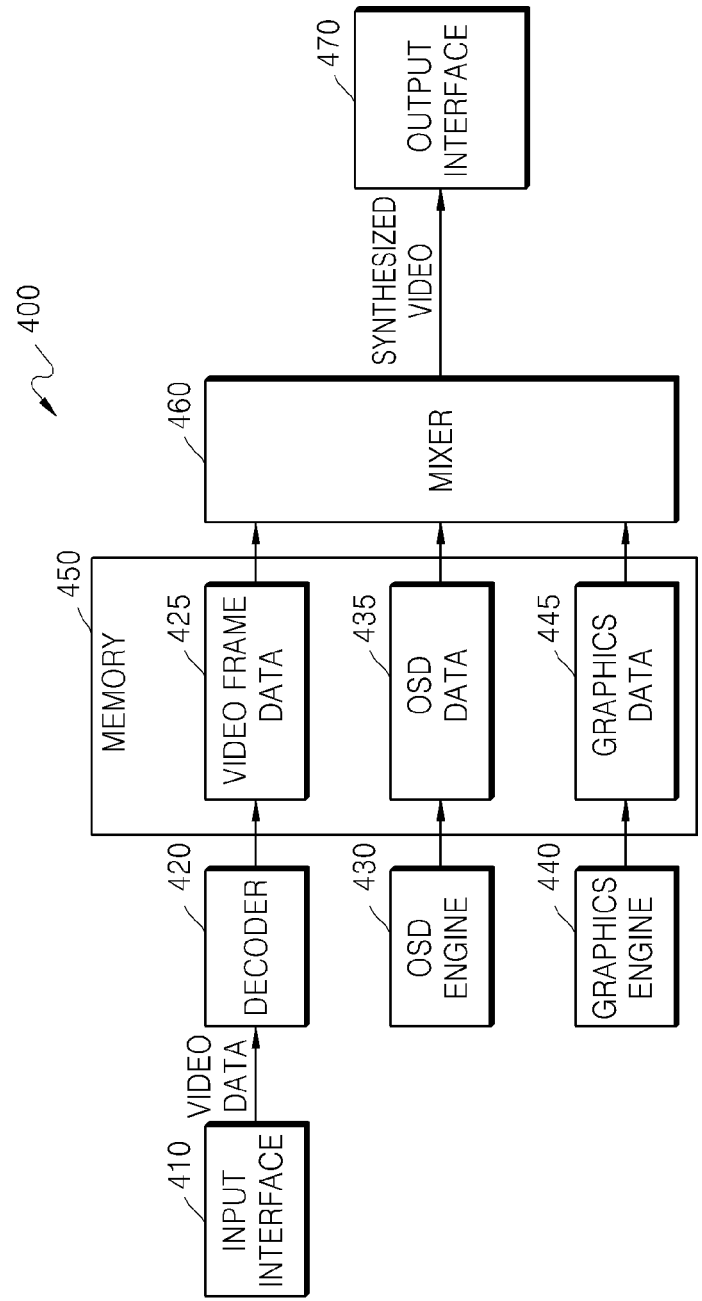
FIG. 4 is a block diagram of a video reproduction apparatus including an OSD engine or graphic engine, according to an exemplary embodiment of the present invention.

FIG. 4 is a block diagram of a video reproduction apparatus 400 including an OSD engine 430 or graphics engine 440, according to an exemplary embodiment of the present invention.

The video reproduction apparatus 400 may decode a video stream, which is input through an input interface 410, using a decoder 420 and sequentially store decoded video frame data 425 in a memory 450 or a buffer.

The OSD engine 430 or graphics engine 440 of the video reproduction apparatus 400 may generate OSD data 435 or graphics data 445 to be displayed on a screen and store the generated data in the memory 450. The OSD engine 430 or graphics engine 440 may be hardware or software which may generate the OSD data 435 or graphics data 445, respectively.

A mixer 460 may output a synthesized video using the video frame data 425 and the OSD data 435 (or graphics data 445) stored in the memory 450 so as to display the OSD data 435 (or graphics data 445) on the video frame data 425 as the synthesized video.

The synthesized video may be output through an output interface 470 and reproduced on a display panel, transmitted through a communication channel, or used by other video processing systems or video editing systems.

The mixer 460 may perform a mixing process using an a blending technique capable of controlling the transparency of the OSD data 435 or graphics data 445. For example, in the case of an αRGB blending technique, which is an a blending technique, each sample of the OSD data 435 or graphics data 445 may include an a channel, a R channel, a G channel, and a B channel.

The R, G, and B channels exhibit color and brightness information of data, and the a channel exhibits the transparency of the OSD data 435 displayed on the screen. The color and brightness information may be expressed according to the YUV color model instead of the RGB color model.

When watermark insertion is performed by hardware, the operational speed is high, but an additional hardware construction is required for additional watermark insertion, and correcting a watermarking algorithm later is difficult. By comparison, a process of inserting a watermark using software needs a large amount of calculations, thereby precluding real-time watermark insertion.

In particular, watermark insertion using software for high-definition television (HDTV) services requires a lot of central processing unit (CPU) resources. In the case of full-HD contents, when a watermark is inserted into the entire video area, an addition operation must be performed 1920×1080×60 times per second. Accordingly, when watermark insertion is embodied by software, it is difficult to perform operations in real-time.

Therefore, a watermark may be inserted in real-time using a hardware overlay device or video mixer, which is used for an OSD menu in a conventional video reproduction apparatus, such as a TV. Hereinafter, examples of the video reproduction apparatus 400 of FIG. 4 to which the video reproduction apparatus 100 having the watermark inserting function shown in FIG. 1 is applied will be described in detail with reference to FIGS. 5 and 6.

Figure 5:
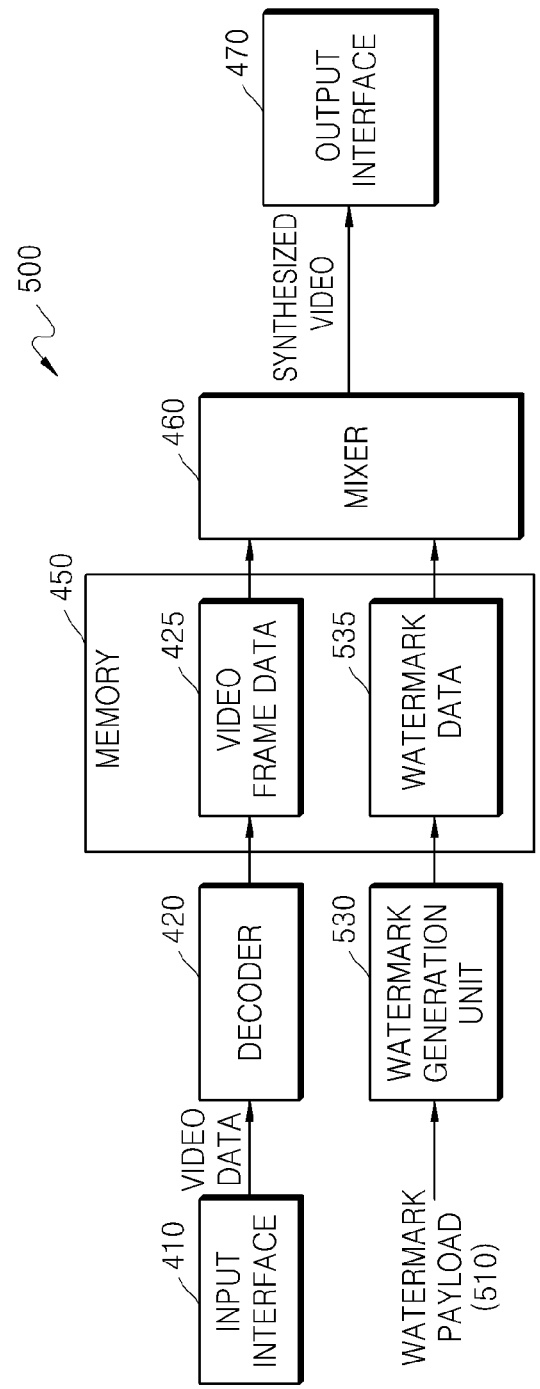
FIG. 5 is a block diagram of an expanded example of the video reproduction apparatus shown in FIG. 1.

FIG. 5 is a block diagram of an expanded example of the video reproduction apparatus 100 shown in FIG. 1.

A video reproduction apparatus 500 having a watermark inserting function may be the expanded apparatus obtained by applying the video reproduction apparatus 100 to the video reproduction apparatus 400. Specifically, in the video reproduction apparatus 500 having the watermark inserting function, a decoder 420 may decode video data received through an input interface 410, and a memory 450 or buffer may sequentially store decoded video frame data 425 as an original video.

A watermark generation unit 530 of the video reproduction apparatus 500 having the watermark inserting function may correspond to the OSD engine 430 or the graphics engine 440 of the video reproduction apparatus 400 in FIG. 4 and may generate watermark data 535 instead of the OSD data 435 or graphics data 445, and store the watermark data 535 in the memory 450.

The watermark data 535 may be synthesized with the video frame data 425 stored in the memory 450 by a mixer 460, and a synthesized video may be output as a watermark-inserted video through an output interface 470.

The watermark generation unit 530 may receive a watermark payload 510 and generate a watermark pattern. The watermark payload 510 may be intrinsic information on the reproduction of the video reproduction apparatus 500 having the watermark inserting function.

For example, the watermark payload 510 may provide intrinsic ID information of the video reproduction apparatus 500 having the watermark inserting function and information on a reproduction position, a reproduction time, or a user. For example, since an Internet Protocol TV (IPTV) service utilizes intrinsic ID information on each service subscriber in order to provide contents, information on a user may be used as the watermark payload 510.

The watermark generation unit 530 may generate the watermark pattern using the watermark payload 510 and convert the watermark pattern into video-data-type watermark data 535 that can be synthesized by an OSD data mixer. The watermark generation unit 530 may determine a color channel and brightness of each pixel in order to generate the watermark data 535 to be mapped to each sample value of the watermark pattern.

For example, when a basic watermark pattern having a bit stream including bits having a value of '0' or '1' is inserted into only an R-channel area, an R-channel element value of watermark data 535 generated with respect to the '0' or '1' bits of the basic watermark pattern may be set as '0' or '255' so that the watermark pattern can be inserted into only the R-channel area of a color video.

Also, when the watermark data 535 is inserted into a brightness channel area of the memory 450, (R, G, B) may be respectively expressed as (0, 0, 0) or (255, 255, 255) with respect to each '0' or '1' bit of the watermark pattern. Here, (R, G, B) denotes an R-channel element value, a G-channel element value, and a B-channel element value, respectively. In addition, (R, G, B) may be variously expressed according to a watermarking technique.

The mixer 460 may control the transparency of a watermark according to an a blending technique or an αRGB blending technique and mix the video frame data 425 with the watermark data 535. The mixer 460 may allow the watermark data 535 to be displayed on a screen of the video frame data 425 in the same manner as when OSD data or graphics data is displayed on a screen.

The mixer 460 may control the transparency of the watermark according to a value α of the α blending technique and mix a video with the watermark data 535. As the value α increases, an element of the watermark data 535 strengthens as contrasted with the original video frame data 425 so that it becomes easier to detect the watermark. However, the invisibility of the watermark may be reduced and the quality of the contents may be degraded.

Conversely, as the value α decreases, the element of the watermark data 535 weakens as contrasted with the original video frame data 425 so that it becomes more difficult to detect the watermark. However, the invisibility of the watermark may be increased and the quality of the contents may be improved.

Accordingly, the value α needs to be appropriately controlled to ensure the invisibility of the watermark and increase detection possibility. The range within which the value α is usable may be different according to the kind of the mixer 460. In order to ensure the invisibility of the watermark, the value α may be determined to maximize transparency within such a range as to enable the detection of the watermark.

The watermark-inserted video generated by the mixer 460 may be output through the output interface 470 to a display capable of reproducing a video. In this case, after the video reproduction apparatus 500 having the watermark inserting function reproduces the watermark-inserted video, when a secondary user having no authority to use the watermark-inserted video stores or records the video reproduced by the video reproduction apparatus 500 having the watermark inserting function and externally utilizes or distributes the video, watermark data may be detected using the watermark-inserted video, and the secondary user, a contents distributor, a video storage (or recording) position, and a time may be traced.

Figure 6:
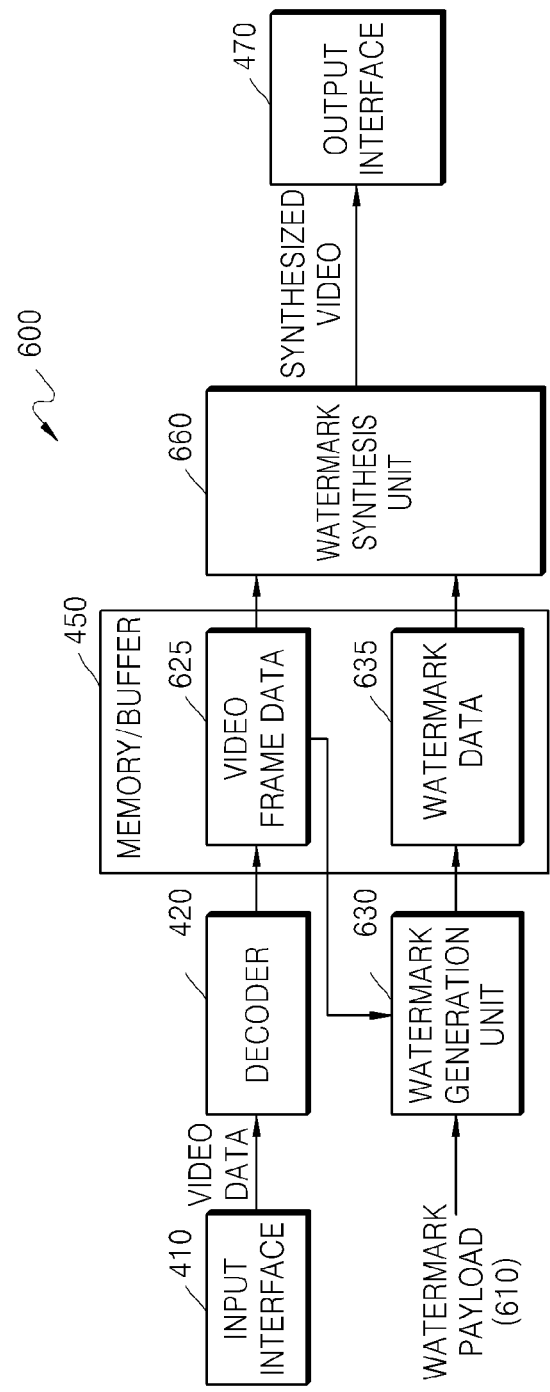
FIG. 6 is a block diagram of another expanded example of the video reproduction apparatus shown in FIG. 1.

FIG. 6 is a block diagram of another expanded example of the video reproduction apparatus 100 shown in FIG. 1.

A video reproduction apparatus 600 having a watermark inserting function may be an extended type of an apparatus obtained by applying the video reproduction apparatus 100 to the video reproduction apparatus 400.

Specifically, in the video reproduction apparatus 600 having the watermark inserting function, a decoder 420 may decode video data received through an input interface 410, and a memory 450 or buffer may sequentially store the decoded data as video frame data of an original video 625.

A watermark generation unit 630 may generate a watermark data 635 instead of OSD data 435 or graphics data 445, and store the watermark data 635 in the memory 450. The watermark data 635 may be synthesized with the video frame data of original video 625 stored in the memory 450 by a watermark synthesis unit 660, and the synthesized video may be output as a watermark-inserted video through an output interface 470.

The watermark generation unit 630 may receive a watermark payload 610 and generate a watermark pattern. The watermark payload 610 may be intrinsic information on the reproduction of the video reproduction apparatus 600 having the watermark inserting function. For example, the watermark payload 610 may provide one of intrinsic ID information of the video reproduction apparatus 600 having the watermark inserting function and information on a reproduction position, a reproduction time, or a user.

The watermark generation unit 630 may generate the watermark pattern and convert the watermark pattern into video-data-type watermark data 635. In this case, the watermark generation unit 630 may determine a color channel and brightness of each pixel to be mapped with respect to each bit of a bit stream of the watermark pattern.

The watermark synthesis unit 660 may mix the video frame data of original video 625 with the watermark data 635. The watermark synthesis unit 660 may allow the watermark data 635 to be displayed with the video frame data of original video 625 on a screen.

The watermark generation unit 630 may analyze the video characteristics of the video frame data of original video 625 using an area analysis unit (not shown) and control the insertion intensity of the watermark based on an analysis result.

For example, even if the insertion intensity of a watermark is high in an area where other noise cannot be easily recognized, such as areas of high noise or much texture, the invisibility of the watermark may be maintained. On the other hand, the insertion intensity of the watermark should be low in an area where other noise is easily recognized, such as flat areas or noise-free areas, so that the invisibility of the watermark can be ensured.

In order to analyze a noise element or texture element for each area of the video frame data of original video 625, the area analysis unit may use a variance of each area of the video frame data of original video 625. On the basis of the variance of each area of the video frame data of original video 625 analyzed by the area analysis unit, watermark data may be inserted with high insertion intensity into a high-variance area, such as an area of high noise or much texture, while the watermark data may be inserted with low insertion intensity into a low-variance area, such as a flat area or noise-free area.

The watermark generation unit 630 may determine a value α indicating the transparency of watermark data generated based on the characteristics of each area of the video frame data of original video 625. For example, when it is determined that an area of the video frame data of original video 625 is a complex area based on its variance, the value α of a corresponding area may be controlled to be high to lower the transparency of the watermark data, thus allowing the watermark data to be strongly inserted into the area. Conversely, when it is determined that an area of the video frame data of original video 625 is a simple area based on its variance, the value α of the corresponding area may be controlled to be low, thus allowing the watermark data to be weakly inserted into the area.

Also, the watermark generation unit 630 may control not only the above-described value α of the watermark data, but also the watermark data, based on the analysis result of each area of the video frame data of original video 625 by the area analysis unit (not shown).

Furthermore, when a basic watermark pattern has a bit stream, it is assumed that a bit with a value of '0' is set as one of pixel brightness values of 0 to 127, and a bit with a value of '1' is set as one of pixel brightness values of 128 to 255.

After the area analysis unit analyzes the characteristics of each area of the video frame data of original video 625, a value that is closer to 0 than to 127 may be selected for the '0' bit, and a value that is closer to 255 than to 128 may be selected for the '1' bit in a complex area, such as an area of high noise or much texture, so that a variation in the color or brightness of the watermark relative to a variation of the values of the watermark pattern can be increased to permit strong insertion of the watermark.

Conversely, a value that is closer to 127 than to 0 may be selected for the '0' bit, and a value that is closer to 128 than to 255 may be selected for the '1' bit in a simple area, such as an area of low noise or small texture, so that a variation in the color or brightness of the watermark relative to a variation of the values of the watermark pattern can be decreased to increase the invisibility of the watermark.

As another example, when each sample value of a watermark pattern is a real number or an integral number instead of a bit stream, the area analysis unit may analyze the characteristics of each area of the video frame data of original video 625. Thus, the range of color or brightness of a pixel to which a sample value of the watermark is mapped may be widened in a complex area. For example, the sample value may be mapped to a range [0,255]. Conversely, the range of color or brightness of a pixel to which a sample value of the watermark is mapped may be narrowed in a simple area. For example, the sample value may be mapped to a range [100,156]. As a result, the invisibility of the watermark may be increased.

Accordingly, the video reproduction apparatus 600 having a watermark inserting function may control insertion intensity or watermark data according to video characteristics of the video frame data of original video 625, thereby maintaining the invisibility of a watermark and improving the quality of a watermark-inserted video.

As described above with reference to FIGS. 5 and 6, the video reproduction apparatuses 500 and 600 having the watermark inserting functions according to the exemplary embodiments of the present invention may insert a watermark using the mixer 460 of the video reproduction apparatus 400 or a hardware overlay apparatus, so that the watermark can be inserted in real-time into high-capacity video data, such as HD contents, while maintaining low CPU usage.

Figure 7:
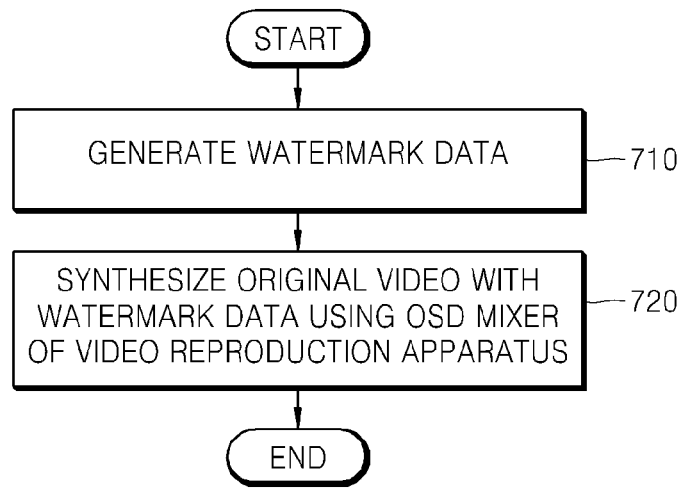
FIG. 7 is a flowchart of a method of inserting a watermark into a video being reproduced, according to an exemplary embodiment of the present invention.

FIG. 7 is a flowchart of a method of inserting a watermark into a video being reproduced, according to an exemplary embodiment of the present invention.

In operation 710, watermark data indicating reproduction of an original video may be generated.

An intrinsic value related to the reproduction of the original video may be at least one of intrinsic ID information of a video reproduction apparatus having a watermark inserting function, reproduction position information, reproduction time information, and user ID information. A color element and brightness for each pixel may be mapped to each sample of a watermark pattern so that video-data-type watermark data may be generated. The mapped color element and brightness for each pixel may be determined based on the characteristics of each area of the original video or the user's designation.

In operation 720, the original video may be synthesized with the watermark data using at least one of an OSD data mixer and a graphics data mixer of the video reproduction apparatus to generate a watermark-inserted video. In this case, the watermark data may be displayed on the original video using mixing hardware, such as the OSD data mixer or the graphics data mixer of the video reproduction apparatus, thereby generating the watermark-inserted video. The transparency of the watermark data may be controlled according to an insertion intensity determined based on the characteristics of each area of the original video or the user's designation.

As a result, the watermark data may be synthesized with the original video being reproduced, using a conventional OSD data mixer or graphics data mixer instead of using an additional hardware apparatus or software application required for watermark insertion, and thus, watermark insertion may be performed in real-time.

Figure 8:
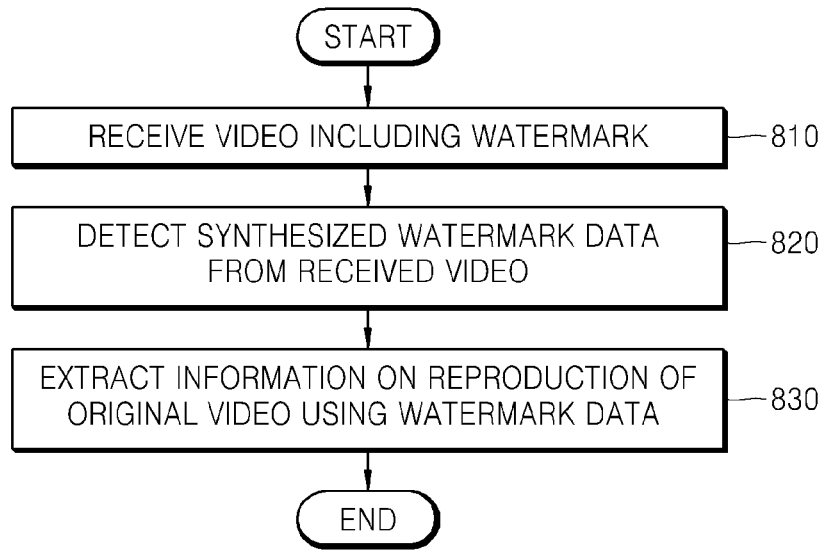
FIG. 8 is a flowchart of a method of detecting a watermark according to an exemplary embodiment of the present invention.

FIG. 8 is a flowchart of a method of detecting a watermark according to an exemplary embodiment of the present invention.

In operation 810, a video including a watermark may be received. The received video may be a video generated using an OSD data mixer or graphics data mixer included in an apparatus that generates the received video. Watermark data, of which the transparency is controlled according to an insertion intensity of the watermark data, may be synthesized with an original video by the OSD data mixer or the graphics data mixer of a video reproduction apparatus, thereby generating the received video.

In operation 820, the watermark data may be detected from the received video. The watermark data may be video-data-type data into which a watermark pattern indicating information on the reproduction of the original video is converted.

In operation 830, information on the reproduction of the original video of the received video may be extracted using the detected watermark data. The information on the reproduction of the original video may include at least one of intrinsic ID information of a video reproduction apparatus having a watermark inserting function, reproduction position information, reproduction time information, and user ID information.

Accordingly, information on the video generation apparatus that generates the received data or information on a user of the video generation apparatus may be extracted from the received video, so that a production position, production time, producer, or distributor of the received video may be traced.

The exemplary embodiments of the present invention can be embodied as computer readable code and can be implemented in general-use digital computers that execute the computer readable code using a computer readable recording medium. Examples of the computer readable recording medium include magnetic storage media (e.g., ROM, floppy disks, hard disks, etc.), optical recording media (e.g., CD-ROMs, or DVDs), and storage media.

In the drawings and specification, exemplary embodiments of the invention have been disclosed and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method of inserting a watermark into a video data, the method comprising:
generating watermark data indicating information on reproduction of the video data;
mapping values of bits of the watermark data having a first value to a first color value of a color range of the video data and mapping values of bits of the watermark data having a second value to a second color value of the color range of the video data; and
synthesizing the mapped watermark data and the video data by writing color channel values of pixels of the video data at which the watermark data is to be synthesized with the video data to the first value and the second value corresponding to the bits of the watermark data using an on-screen-display (OSD) data mixer of a video data reproduction apparatus.

2. The method of claim 1, wherein the watermark data includes at least one of data-type color information and transparency information.

3. The method of claim 2, wherein the at least one of the data-type color information and the transparency information is invisible when the watermark data is synthesized with the video data.

4. The method of claim 1, wherein the generating watermark data comprises:
analyzing characteristics of each area of the video data; and determining an insertion intensity of the watermark for each area based on characteristics of a corresponding area.

5. The method of claim 4, wherein the generating of watermark data further comprises controlling at least one of color information and transparency information of the watermark for each area based on the insertion intensity of the watermark for the corresponding area.

6. The method of claim 4, wherein the characteristics of each area include at least one of complexity, brightness information, and color information of each area.

7. The method of claim 1, wherein the information on reproduction of the video data indicates information on at least one of identification information of the video data reproduction apparatus, a reproduction position, a production time, a reproduction time, and an identification of a user of the video reproduction apparatus.

8. A non-transitory computer-readable medium having embodied thereon a computer program for causing a computer to execute the method of claim 1.

9. The method of claim 1, wherein the generating of watermark data comprises:
generating a basic watermark pattern based on the information on reproduction of the video data; and
mapping the basic watermark pattern to the first color values and the second values, by a mixing process using the OSD data mixer.

10. The method of claim 9, wherein the generating watermark data further comprises:
analyzing characteristics of each area of the video data; and
mapping the basic watermark pattern to the first color values and the second color values based on the characteristics of a corresponding area,
wherein the characteristics of each area include at least one of complexity, brightness information, and color information of each area.

11. A video data reproduction apparatus having a watermark inserting function, the apparatus comprising:
an original video data storage unit that stores a video data;
a watermark data generation unit that generates watermark data indicating information on reproduction of the video data, and maps values of bits of the watermark data having a first value to a first color value of a color range of the video data and maps values of bits of the watermark data having a second value to a second color value of the color range of the video data; and
a watermark synthesis unit that synthesizes the mapped watermark data and the video data by writing color channel values of pixels of the video data at which the watermark data is to be synthesized with the video data to the first value and the second value corresponding to the bits of the watermark data using an on-screen-display (OSD) data mixer.

12. The apparatus of claim 11, wherein the watermark data generation unit generates a basic watermark pattern based on the information on reproduction of the video data and maps the basic watermark pattern to the first color values and the second color values using a mixing process.

13. The apparatus of claim 12, wherein the watermark data generation unit analyzes characteristics of each area of the video data and maps the basic watermark pattern to the first color values and the second color values based on the characteristics of a corresponding area,
wherein the characteristics of each area of the original video data include at least one of complexity, brightness information, and color information of each area.

14. The apparatus of claim 11, wherein the watermark data includes at least one of data-type color information and transparent information.

15. The apparatus of claim 14, wherein the at least one of the data-type color information and the transparency information is invisible when the watermark data is synthesized with the video data.

16. The apparatus of claim 11, wherein the watermark data generation unit analyzes characteristics of each area of the video data and determines a watermark intensity for each area based on characteristics of a corresponding area.

17. The apparatus of claim 16, wherein the watermark data generation unit controls at least one of color information and transparency information of the watermark for the corresponding area based on the watermark intensity.

18. The apparatus of claim 16, wherein the characteristics of each area of the original video data include at least one of complexity, brightness information, and color information of each area.

19. The apparatus of claim 11, wherein the information on reproduction of the video data indicates information on at least one of identification information of the video data reproduction apparatus, a reproduction position, a production time, a reproduction time, and an identification of a user of the video data reproduction apparatus.

20. A method of detecting a watermark, comprising:
receiving a video data including a watermark;
detecting watermark data from the received video data;
extracting information on reproduction of an original video data of the received video data using the detected watermark data,
wherein the watermark data is video-data-type data into which a watermark pattern indicating information on the reproduction of the original video data is converted, and
wherein the received video data is generated by mapping values of bits of the watermark data having a first value to a first color of a color range of the original video data and mapping values of bits of the watermark data having a second value to a second color value of the color range of the original video data and synthesizing the watermark mapped data by writing color channel values of pixels of the original video data at which the watermark data is to be synthesized with the original video data to the first value and the second value corresponding to the bits of the watermark data using an on-screen-display (OSD) data mixer.

21. A non-transitory computer-readable medium having embodied thereon a computer program for causing a computer to execute the method of claim 20.

22. A watermark detection apparatus comprising:
a receiving unit that receives a video data including a watermark;
a watermark detection unit that detects the watermark to obtain watermark data from the received video data; and
an original video data information extraction unit that extracts information on reproduction of an original video data of the received video data using the watermark data,
wherein the watermark data is video-data-type data into which a watermark pattern indicating information on the reproduction of the original video data is converted, and
wherein the received video data is generated by mapping values of bits of the watermark data having a first value to a first color value of a color range of the original video data and mapping values of bits of the watermark data having a second value to a second color value of the color range of the original video data and synthesizing the watermark mapped data by writing color channel values of pixels of the original video data at which the watermark data is to be synthesized with the original video data to the first value and the second value corresponding to the bits of the watermark data using an on-screen-display (OSD) data mixer.

* * * * *